United States Patent [19]
Sullivan et al.

[11] 3,945,394
[45] Mar. 23, 1976

[54] PRESSURE-RESPONSIVE VALVE

[75] Inventors: Arthur Francis Sullivan, Redmond; Frank Howard Brockett, III, Bellevue; Lewis John Harthan, III, Redmond, all of Wash.

[73] Assignee: The International Nickel Company, Inc., New York, N.Y.

[22] Filed: Mar. 21, 1975

[21] Appl. No.: 560,575

[52] U.S. Cl. .................. 137/430; 137/546; 37/59; 137/493.9
[51] Int. Cl.² ........................................ F16K 31/18
[58] Field of Search .......... 137/403, 430, 453, 546, 137/493.9; 37/58, 59; 302/15

[56] References Cited
UNITED STATES PATENTS

| | | | |
|---|---|---|---|
| 661,609 | 11/1900 | Hoover | 302/15 |
| 2,096,595 | 10/1937 | Sanford | 37/58 |

*Primary Examiner*—Harold W. Weakley
*Attorney, Agent, or Firm*—George N. Ziegler; Ewan C. MacQueen; Raymond J. Kenny

[57] ABSTRACT

Dual function valve for controlling flow of liquids or mixtures of liquids and solids has a movable seat for relief of excessive negative pressure and a buoyant gate for emergency discharge under excessive loads of solids.

10 Claims, 4 Drawing Figures

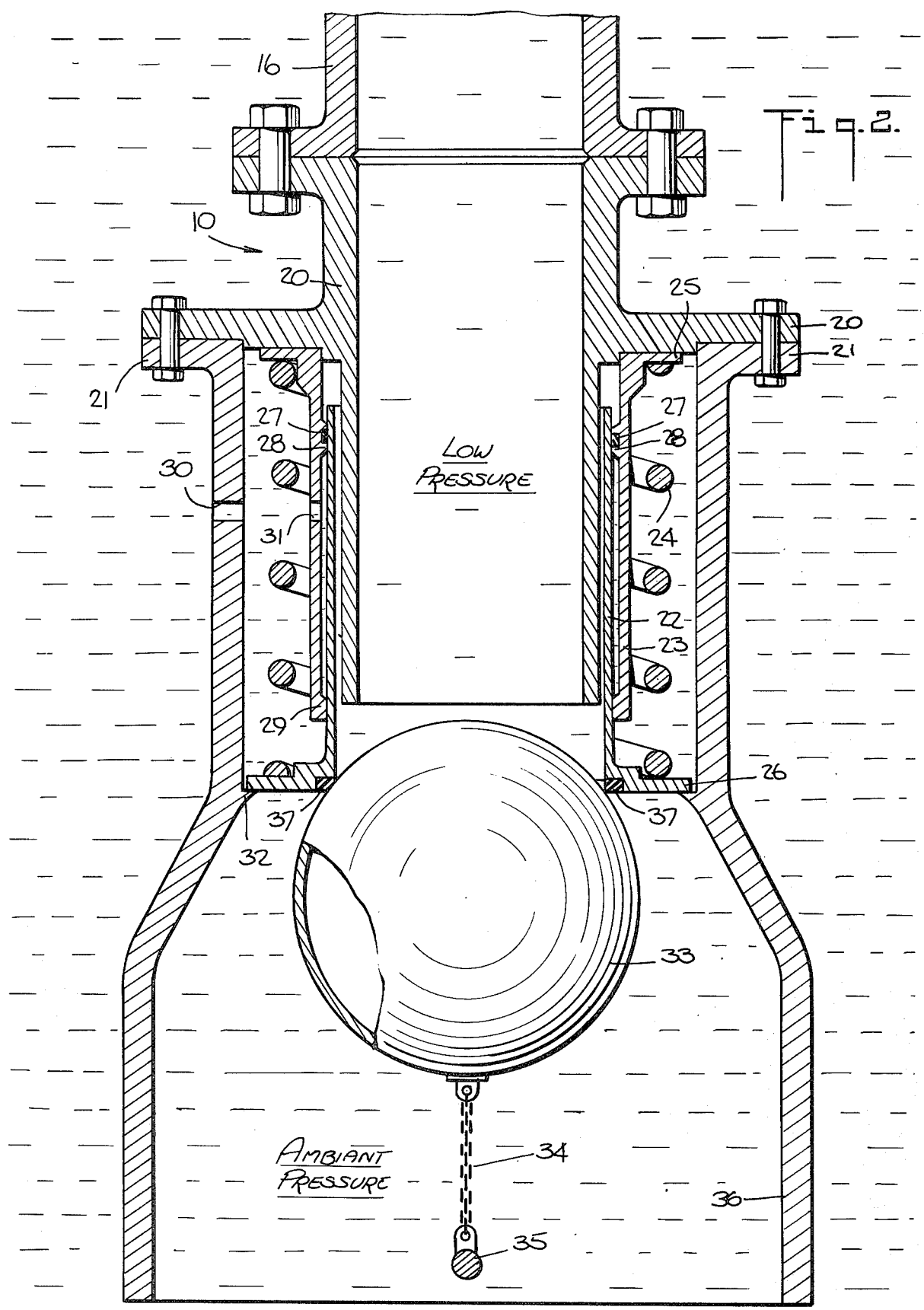

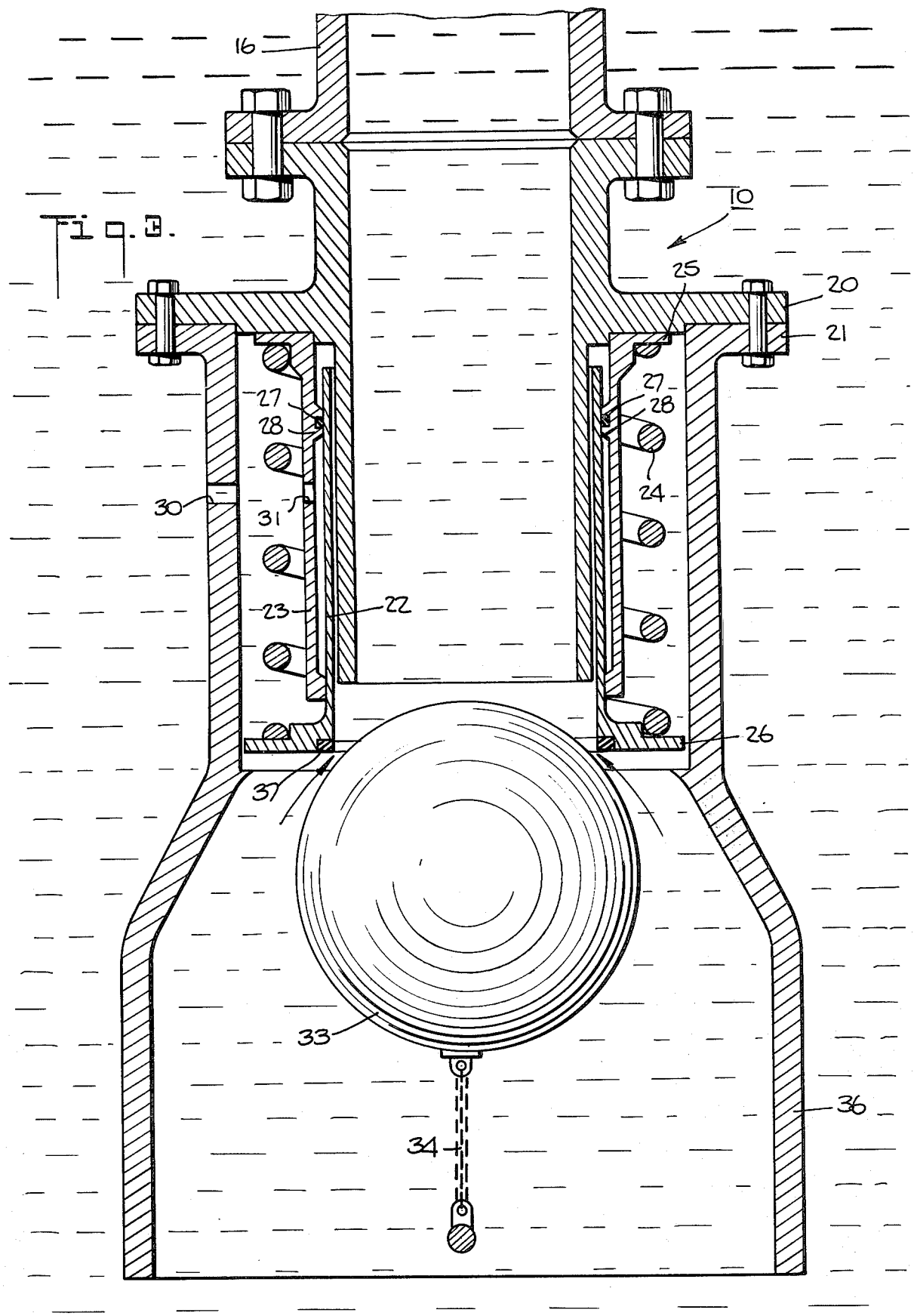

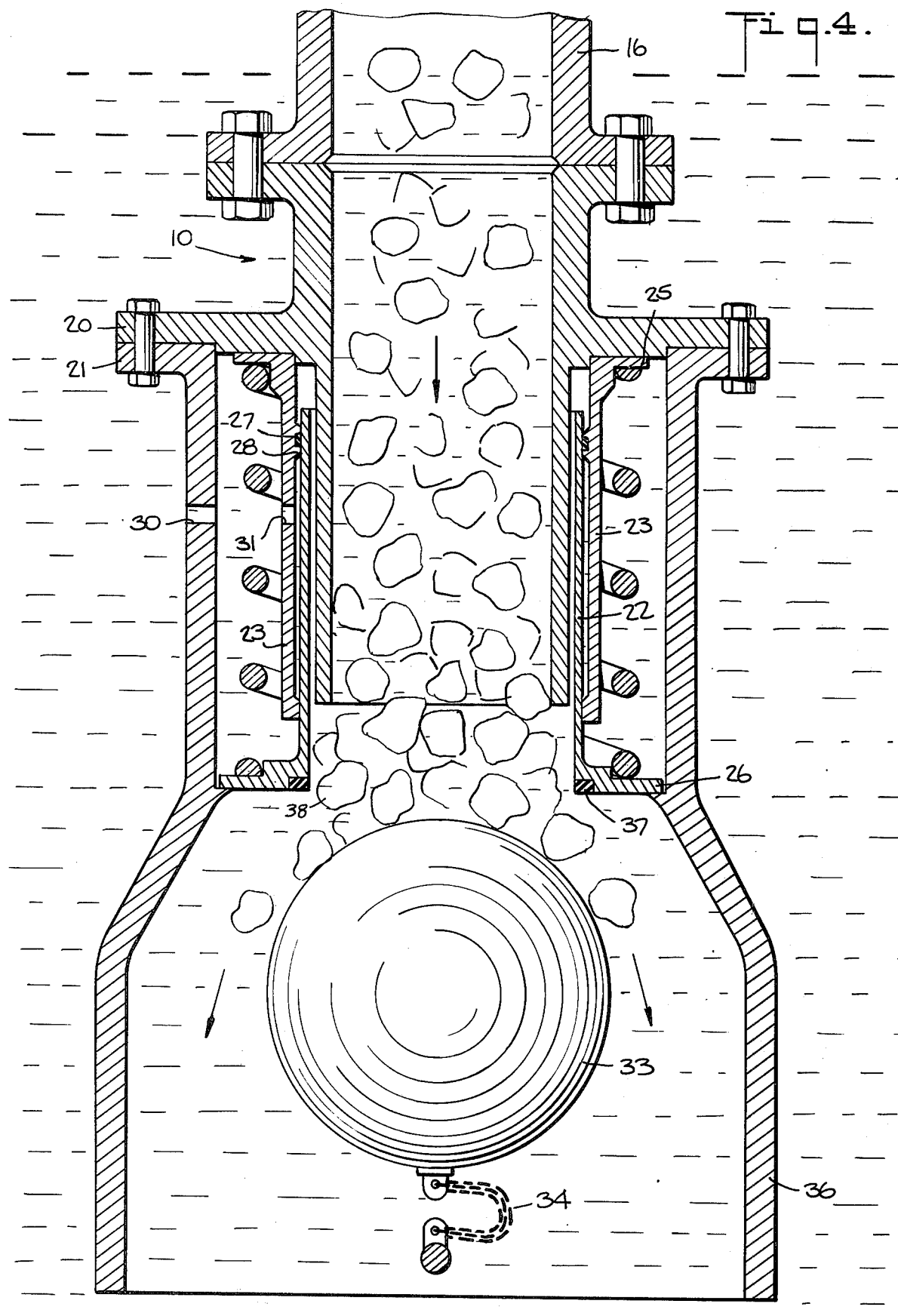

PRESSURE-RESPONSIVE VALVE

The present invention relates to hydraulics and more particularly to valves for controlling the pressure and flow of fluids, including fluids mixed with solids.

It is well known that flow of fluids can convey heavier solids upwards and fluid flow has been used to carry solid minerals up through conduits, provided the fluid flow is maintained sufficiently rapid in relation to the solids characteristics, e.g., density, particle size or shapes. Of course, if the flow is interrupted, the heavier solids (of greater specific gravity than the fluid) sink back down in the conduit. Inasmuch as the settling of solids in the conduit may block the conduit and render resumption of flow difficult or practically impossible, or, as the solids may descend into and clog or damage equipment to which the conduit is connected at the lower end, it is highly desirable and often practically necessary to have a means of rapidly opening a lower portion of the conduit in order to enable rapid exhaust of the descending solids. Needs for rapid discharge or dumping of solids are particularly acute where solids are being conveyed upwards through a great length of conduit, such as the thousands of feet of underwater pipeline that may be used to convey solid minerals, e.g., manganese nodules, to the surface from a deep ocean floor, inasmuch as a great weight and volume of mineral matter may be descending during interruption of fluid flow up the conduit.

Needs for control of fluids in conduits also include needs for control or pressure in the conduit. In conduits where fluids are being drawn upward by suction pumping from above, it is highly desirable to have a suction-pressure relief available to serve as a safeguard in the event that the entrance of the conduit becomes blocked or seriously restricted and the pumping system might become overloaded, or the conduit might collapse from exterior pressure if the pressure of the fluid inside the conduit is reduced excessively below the ambient pressure outside the conduit, especially where the conduit comprises hosing.

Furthermore, inasmuch as the sites of needs for dumping solids or relieving fluid pressure may be at great distances from human control, it is important to have valves for dumping and pressure relief that respond and function according to need without requiring transmission of signal commands or actuating power over great distances, e.g., between deepsea floors and the sea surface.

There has now been discovered a valve for pressure relief and rapid dumping that is operable at great depths undersea without requirement for attention or control, or actuating power, from the sea surface.

It is an object of the invention to provide a pressure-relief and solids-discharge valve.

Other objects and advantages of the invention will become apparent from the following description and the accompanying drawing wherein:

FIG. 1 is a schematic depiction of apparatus in an undersea mining system, and a perspective elevational view of an embodiment of the valve of the invention connected thereto; FIGS. 2, 3 and 4 are side views, on an enlarged scale, of a vertical section through the vertical centerline (the horizontal sections generally being annular) of the valve of FIG. 1 when in three different positions depicted as set forth below;

FIG. 2 depicts the closed position;

FIG. 3 depicts the pressure-relief position; and

FIG. 4 depicts the dump position.

Figure 1:
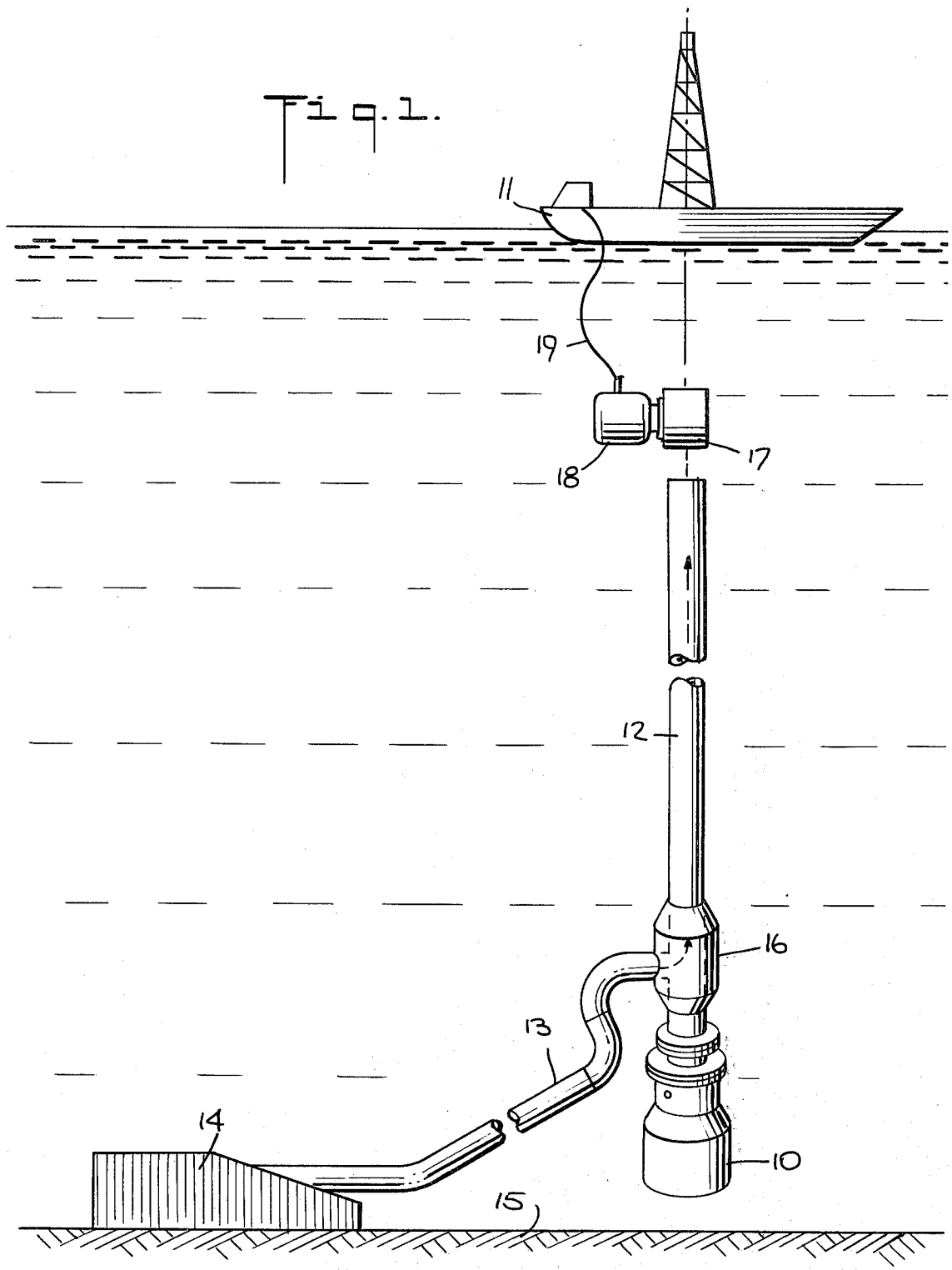

The present invention contemplates a valve that can be connected to a conduit junction, e.g., a Tee or Y-joint, and enable rapid dumping of solids from the conduit or relief of excessive negative pressure in the conduit. The valve has a buoyant gate, which can be a hollow sphere, and a seat that forms a pressure-tight seal with the gate when the buoyant gate floats up against the seat while the valve interior is under negative pressure, such as when the valve is connected to an undersea hydraulic suction conduit. When the gate is in the closed position up against the seat, the negative pressure in the conduit is maintained and pumping of fluid and solids up the conduit can proceed in the desired normal manner. And, when the fluid flow in the conduit is interrupted, or greatly decreased to a slow rate that will not convey the solids upwards, and the solids settle downwards, the weight of the solids that settle down on the buoyant gate forces the gate away from the seat and opens the bottom of the valve and provides a downward discharge opening for rapidly exhausting the descending solids. Also, if fluid pressure in the conduit or valve happens to become positive, the positive pressure can be released by downward displacement of the buoyant gate. (Positive and negative pressures referred to herein in conjunction with fluids in valves, conduits or other undersea apparatus are positive or negative in relation to and respectively greater or less than the ambient fluid pressure outside the apparatus, e.g., the ambient ocean water pressure. Relief of excessively negative pressure inside the valve, and in conduits to which the valve is connected, is provided with an upward movement of the valve seat away from the gate to open the valve while upward movement of the buoyant gate is limited by a restraint, such as a tether to the buoyant sphere.

Normally, when the interior fluid is at a desired level of negative pressure, the seat is held in the desired down position by a downward force, which can be provided by a spring. A certain amount of force is required to hold the seat down inasmuch as negative pressure inside the valve exerts upward force on the seat. The downward force is provided in a controlled magnitude that is only sufficient to hold the seat down when the seat, or an extension thereof, is under negative pressure that is not more greatly negative than the maximum hydraulic suction desirable or permissible in the conduit. Thus, if the undersea entrance of the conduit becomes clogged and the pumping from above continues and excessively reduces the internal pressure in the conduit, the excessively negative pressure results in lifting the valve seat up away from the buoyant gate and the valve is opened to provide pressure relief. The extent of the valve opening is relatively small or large according to whether the extent of the negative pressure is relatively small or large, and thus the valve provides pressure relief according to the severity of the need for relief. In practice, the upward force on the seat can be exerted from the top of a sleeve extending up from the seat and exposed at the upper end to the low pressure in the valve, and sealed against the ambient pressure outside the valve, to thereby act by exertion of the pressure differential between the ambient pressure and the internal pressure on the upward facing area of the sleeve and the downward facing area of the seal, respectively.

An advantageous embodiment of the valve of the invention, and an undersea mining system having the valve incorporated therein, are illustrated in the accompanying drawing.

Referring now to the drawing, FIG. 1 depicts dump-relief valve 10 incorporated into an ocean mining system wherein mining ship 11 supports and moves hydraulic transport riser 12 with forearm hose 13 (a hydraulic conveyance duct) attached to undersea mineral collector 14 on undersea floor 16. The riser, hose and valve are connected with T-joint 16, which can comprise one or more swivels for enabling angular deflection of the apparatus. Pump 17, driven by electric motor 18 with current supplied through conductor cable 19 from the ship, is adapted to move a flow of water and solids up from the collector to the ship. Arrows indicate flow during normal pumping operation.

Turning now to FIGS. 2, 3 and 4, valve 10 has neck 20 bolted to body 21 and includes sliding sleeve 22 and collar (or fixed sleeve) 23 disposed concentrically around the shank of the neck. Relief spring 24 extends from collar flange 25 to sleeve flange 26 and is biased toward the extending direction tending to force sleeve and collar flanges farther apart. Collar seal 27, which is mounted in a groove in collar ridge 28 and extends to the sleeve, provides a slidable pressure-tight interwall seal between the vertical walls of the collar and the sleeve. Collar spacer lip 29 is in slidable contact with the sleeve and aids maintaining axial alignment of collar and sleeve. Body port 30 and collar port 31 are open to ambient water pressure in the locale outside the valve body. Yet, in view of the location of the interwall seal above the port, the space above the seal is barred from communication with the ambient pressure and is open to communication with the internal pressure in the neck.

When the valve is in the closed position depicted by FIG. 2, and in the dump position depicted by FIG. 4, the spring forces the sleeve flange down against body shelf 32 and forces the collar flange up against the lower flange of the neck.

The collar and neck flanges can be connected together with pressure-tight joints, e.g., brazed, welded or bolted, or be made integrally as one piece.

The valve contains buoyant sphere 33 attached with tether 34 to tether bar 35 which is rigidly fixed to skirt 36 of the body. The tether is adapted, in conjunction with the associated valve components, to enable the sphere to float up against sleeve seat 37, and function as a buoyant gate, when the sleeve is in the down position depicted in FIG. 2. The tether is also adapted (by length) to restrain the sphere from following the sleeve when the sleeve slides upwards to a pressure-relief position, e.g., to the up position depicted by FIG. 3. Moreover, the tether is adapted to enable downward movement of the sphere readily to lower positions that are out of contact with the sleeve seat, e.g., the dump position depicted by FIG. 4, and thereby open the valve for downward discharge of solids when the sphere is subjected to a downward force greater than the buoyancy of the sphere, such as the downward force of heavier-than-water solids 38 depicted in descent by FIG. 4.

When the valve is connected to the bottom of a suction riser in an undersea mining system, such as illustrated in FIG. 1, then, during normal operation with the pumps functioning satisfactorily, nodules obtained by the collecting vehicle flow along a relatively horizontal forearm hose and then up the vertical riser. The buoyant sphere is normally seated, as a gate, by its positive buoyancy. Moreover, when the pumps are on, the external water pressure is higher than the pressure in the interior of the valve and the ambient, external, water pressure further forces the sphere against the seat. When, by intention or mishap, the pumps cease operating, the nodules fall back down the riser. Packing of the nodules in the forearm hose or the collecting vehicle would be seriously detrimental. With the valve of the invention in place at the bottom of the riser, the nodules fall onto the buoyant sphere and soon overcome the positive buoyancy, and then the sphere is pushed down away from the seat and the nodules exit from the valve, thereby permitting the riser to be cleared and preventing such detrimental results as clogging of the forearm hose or jamming of the collector. The tether and skirt of the valve retain the sphere, and when the riser conduit is cleared and pumping is resumed, the sphere returns to its seat and thereby closes the valve and enables reestablishing negative pressure in the conduit. If desired, the seat can be a chamfered elastomer ring.

The pressure-relief function of the valve is particularly useful where connected to a riser that is above the valve and is being pumped from above, in the event that fluid flow is blocked or hindered at a lower portion of the riser, or at a conduit or collector feeding the riser. For instance, if there is blockage in the collector or clogging in the forearm hose, and intake flow is restricted, pumps may cavitate or motors become overloaded or the forearm hose may collapse due to excessively negative pressure in the riser or hose. The valve can prevent such failures and difficulties by admitting water into the conduit system to relieve the excessive negative pressure. For example, where it is desired to operate the riser and conduit system at pressures of 1-½ atmos. (atmospheres, normal) less than the ambient pressure outside the conduit, the valve can be made with a spring having only just enough force, in relation to the area differential between the upward facing area of the sleeve and the downward facing area of the seat-to-sphere (gate) contact, to exert a downward pressure of 1-½ atmos. on the seat area where in contact with the sphere. When the fluid pressure inside the valve is 1-½ atmos. less than the ambient water pressure outside the valve, the downward force due to the spring and the upward force due to the pressure differential across the ends of the sleeve are in balance, and the seat is on the verge of being lifted from the sphere. When flow conditions change with a blockage at the inlet of the conduit while pumping continues from above, the internal pressure becomes more negative and, within the valve, the upward force on the sleeve and seat increases and the seat is raised upwards while the sphere is retained by the tether. Thus, the valve is opened and water is permitted to flow into the riser and relieve the excessive negative pressure.

In an event that the internal pressure drops to 3 atmos. below the ambient water pressure, the spring is compressed further and the valve becomes full open and permits inward flow of 2000 gallons per minute where the internal cross section of the valve is at least 8 inches in diameter.

The present invention is particularly applicable for controlling the pressure of water in undersea mining apparatus, including conduits, pipelines and risers, and for rapidly discharging heavier-than-water solid materials that may be present therein along with the water, e.g., manganese nodules in sea water.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A valve for controlling flow and pressure of fluid therein while the valve is surrounded by an external fluid at an ambient pressure, and for controlling flow of heavier solids when present with the fluid in the valve, comprising:
   a. a valve body having an upward facing opening adapted to be joined to a hydraulic conduit, a downward facing opening below the upward facing opening, an open interior providing a continuously downward passage for fluid and solids from the upward opening to the downward opening and being in fluid pressure communication with the upward opening;
   b. a valve seat having an upper face and a lower face and being disposed to have the upper face in fluid pressure communication with fluid inside the body and the lower face in fluid pressure communication with the ambient pressure of fluid outside the body and having an open passway from the lower face to the upper face;
   c. means for maintaining the seat vertical and movable vertically in relation to the body;
   d. a seal disposed and adapted to prevent pressure communication of the ambient pressure to the upper face of the seat;
   e. downward force means for forcing the seat toward the downward facing opening of the body;
   f. a downward movement limit stop to prevent downward movement of the seat beyond a preselected down position where the lower face of the seat is in the downward opening of the body;
   g. a buoyant gate disposed and adapted to float upward in the external fluid and into pressure-sealing contact with the passway in the lower face of the seat when the seat is in the down position; and
   h. a retainer adapted for limiting movement of the buoyant gate upward beyond the preselected down position of the seat, said retainer being also adapted for permitting downward movement of the gate and for retaining the gate from moving farther than a preselected distance away from the valve body.

2. A valve as set forth in claim 1 wherein the seat is a hollow cylindrical sleeve disposed in a vertical position and the upper face of the seat is the upper end of the sleeve and the lower face of the seat is the lower end of the sleeve.

3. A valve as set forth in claim 2 wherein the lower face of the seat comprises an annulus of resilient material at the lower end of the sleeve.

4. A valve as set forth in claim 2 wherein the means for maintaining the sleeve vertical comprises a hollow cylindrical collar disposed concentrically around, and spaced apart from, the sleeve and wherein the seal extends across the space between the collar and the sleeve.

5. A valve as set forth in claim 1 wherein the downward force means is a spring.

6. A valve as set forth in claim 5 wherein the spring is a helical coil spring disposed to exert upward force on the collar and downward force on the sleeve.

7. A valve as set forth in claim 1 wherein the buoyant gate is a hollow sphere.

8. A valve as set forth in claim 7 wherein the retainer is a flexible tether having one end attached to the hollow sphere and the other end connected to the body.

9. A valve as set forth in claim 2 wherein the sleeve has a flange extending radially outward from the sleeve cylinder and wherein the downward movement limit stop comprises a shelf projection extending inward from the body.

10. In an undersea mining apparatus having a hydraulic suction riser, the improvement comprising, in combination therewith and in fluid communication with the riser by means of a conduit junction in the riser below the top of the riser, a valve as set forth in claim 1.

* * * * *